Figure 1:
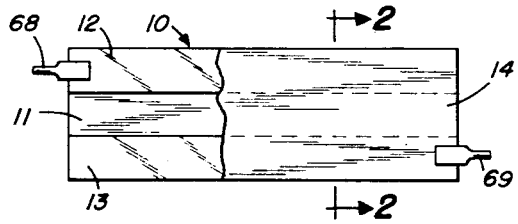

Feb. 27, 1962

A. WEXLER ET AL 3,022,667

ADSORPTION ELECTRIC HYGROMETER

Original Filed Jan. 31, 1955

2 Sheets-Sheet 1

INVENTORS
ARNOLD WEXLER
ALBERT KRINSKY
SAMUEL B. GARFINKEL

BY R. J. Tompkins

ATTORNEY

INVENTORS
ARNOLD WEXLER
ALBERT KRINSKY
SAMUEL B. GARFINKEL

United States Patent Office 3,022,667
Patented Feb. 27, 1962

3,022,667
ADSORPTION ELECTRIC HYGROMETER
Arnold Wexler, Washington, D.C., and Albert Krinsky, Bethesda, and Samuel B. Garfinkel, Rockville, Md., assignors to the United States of America as represented by the Secretary of the Navy
Original application Jan. 31, 1955, Ser. No. 485,358. Divided and this application Mar. 19, 1959, Ser. No. 800,602
8 Claims. (Cl. 73—336.5)
(Granted under Title 35, U.S. Code (1952), sec. 266)

The invention described herein may be manufactured and used by or for the Government of the United States of America for governmental purposes without the payment of any royalties thereon or therefore.

This invention relates to hygrometers with special reference to apparatus and materials sensitive to rapid changes in relative humidity and is a division of our copending application Serial No. 485,358, filed January 31, 1955, and now abandoned.

In certain hygrometer uses, as for example, in recording relative humidity changes in radiosonde ascents, the speed of movement of the apparatus requires fast detection and registration, speeds of ascent being as high as 1,000 feet per second, with higher speeds anticipated.

Heretofore, dependence for this information was placed upon such instruments as the Dunmore hygrometer which includes as a hygrometer element a flat insulation strip having tin electrodes and a coated film of lithium chloride held on the strip by a plastic binder: and since the resistance of the film varies with relative humidity, a measure of this variable factor is obtainable. The chief difficulty with this and similar hygrometers lies in the inability of the hygrometer element to register the relative humidity changes with sufficient speed. In the case of lithium chloride, for example, this is due, chiefly, to the fact that the element employs a porous binder to retain the lithium chloride solution on the surface of the base material. Thus a volume state exists requiring relatively slow absorption of water vapor to attain a state of equilibrium and causing an important and undesirable lag in the humidity reading.

Broadly stated, the invention here involved is the attainment of a highly sensitive hygrometer with markedly reduced lag through a method of deposition on an electrically non-conducting surface of an exceedingly thin hygrometric film consisting of a material hardly soluble in water, this film serving as part of an electric circuit producing an output nearly linear with the logarithm of the resistance of the film.

Accordingly, an important object of the invention is to provide a film of exceptional thinness for use in electric hygrometers. An object also is to provide a hygrometer which is highly sensitive to small changes in the relative humidity of the ambient atmosphere. Still another object is to provide an electric hygrometer element which is easily reproducible. Other objects include the provision of a hygrometer element which has augmented rapidity of response to discrete changes in relative humidity, which is sensitive at lower as well as higher temperatures, which is reversible in action and which can be made at reduced cost.

Figure 2:
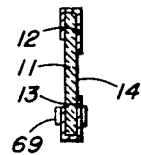
Figure 3:
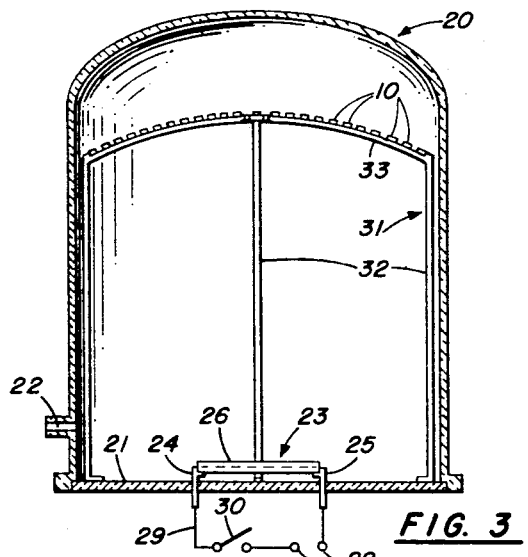
Figure 4:
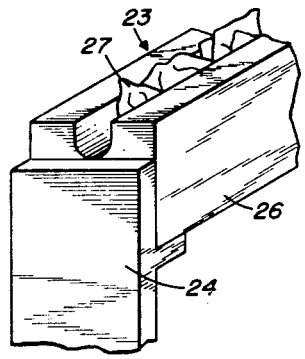
Figure 5:
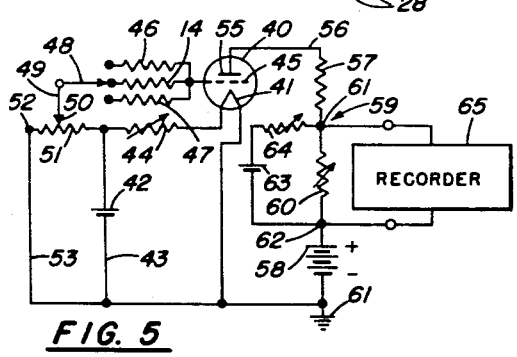
Figure 11:
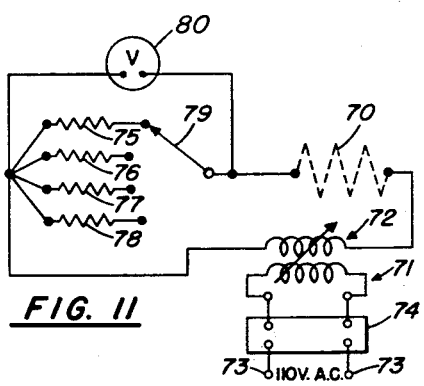
Figure 10:
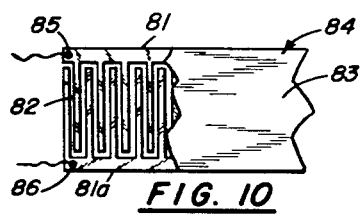
Figure 7:
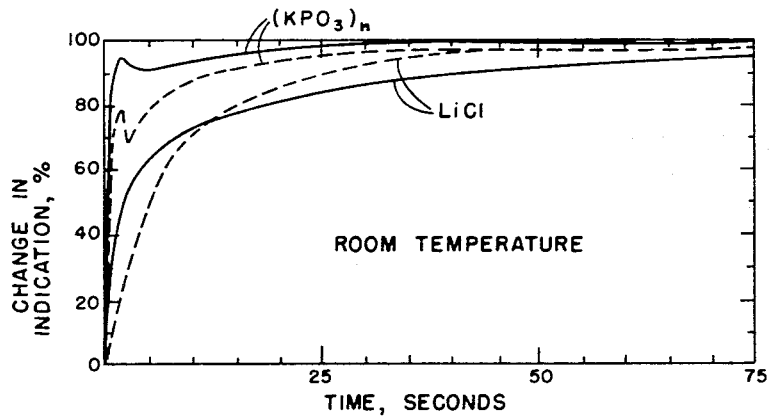
Figure 8:
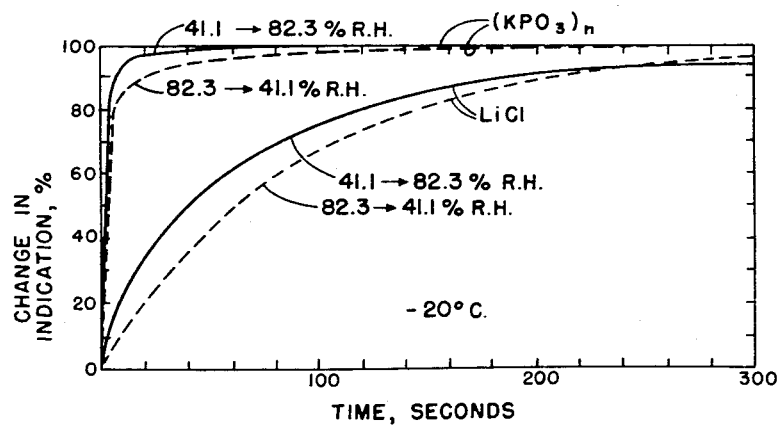
Figure 6:
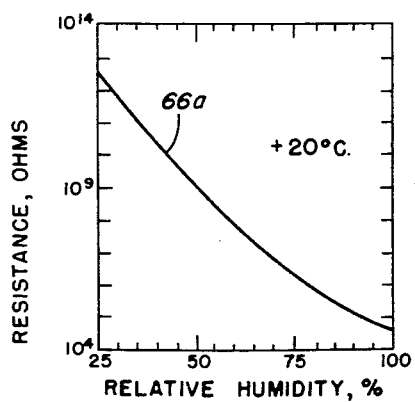
Figure 9:
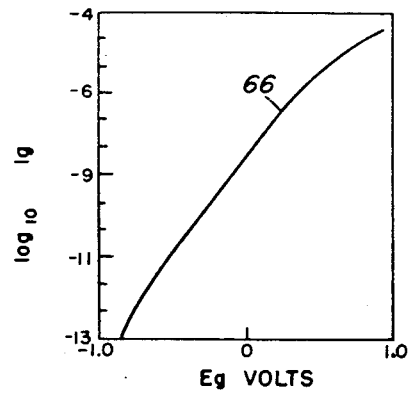

Other objects and many of the attendant advantages of this invention will be readily appreciated as the same becomes better understood by reference to the following detailed descripton when considered in connection with the accompanying drawings wherein:

FIG. 1 is a plan view of the hygrometer unit;

FIG. 2 is a sectional view of the unit of FIG. 1 along lines 2—2 thereof;
FIG. 3 is a view of the bell jar and furnace equipment for film deposition on the unit base;
FIG. 4 is a detail of the furnace construction;
FIG. 5 is a diagram of the direct current circuit used with the hygrometer;
FIG. 6 shows a curve indicating resistance variation of the hygrometer element with relative humidity;
FIG. 7 shows curves comparing time lag variation in humidity indications between hygrometer elements of lithium chloride and potassium metaphosphate at room temperature;
FIG. 8 shows curves as in FIG. 7 for −20° C.;
FIG. 9 shows a curve illustrating electronic tube grid voltage variation with the logarithm of the grid current, for small currents;
FIG. 10 indicates a modified hygrometric unit; and
FIG. 11 is a diagram of an alternating current circuit usable with the hygrometer element at lower resistance values.

The hygroscopic unit 10, as used in this invention, is shown in FIGS. 1 and 2, and includes a base plate 11 in strip form on which are coated electrodes 12 and 13 extending in parallel relation along a face of the plate; and a thin film 14 of hygroscopic material coating the facing plate surface over and between the electrodes. The plate substance is electrically insulating, for example glass or plastic (polystyrene, for example). The electrodes are desirably silver, although other metals may be used. The hygroscopic material may include a wide variety of substances, which in general may be defined as salts, metallic oxides, metals, inorganic compounds and elements, these substances being characterized by the following properties (a) insolubility or highly reduced solubility in water, (b) a melting point lower than the decomposition temperature, and (c) reversible affinity for water vapor. Typical salts are sodium carbonate ($Na_2CO_3$), calcium sulfate ($CaSO_4$), cuprous iodide (CuI), potassium sulfate ($K_2SO_4$), sodium chloride (NaCl), and potassium metaphosphate ($KPO_3$). Typical metallic oxides are silicon dioxide ($SiO_2$), nickel oxide (NiO), cobalt oxide (CoO), and cupric oxide (CuO). Typical metals are titanium, titanium and gold, and indium. Glass for the base, silver for the electrodes and potassium metaphosphate for the hygroscopic material are selected for the description.

In the preparation of the moisture sensitive unit, glass blanks are cut from thin plates to a size of ½ x 3 x 1/32 inches to form strips. This glass is thoroughly cleaned by washing with detergent and water, rinsing with distilled water, immersing successively in benzol and acetone, leaching in nitric acid at 80° C. for one hour and again rinsing with distilled water. Silver paint is then sprayed, along the entire length of the long edges of one face of the blank to form parallel electrodes spaced by ¼ inch separation. The blanks are then placed in a furnace and heated at a maintained temperature of 507° C. for 1½ hours to fire the electrodes and anneal the glass. The furnace is then cooled to 310° C. in 20 minutes, the blanks removed and brought to room temperature. The electrodes, after cooling, are then burnished with steel wool and the blanks again cleaned with detergent, distilled water, benzol and acetone.

It was found that with vacuum evaporated film procedure, the desired thin films were obtainable. Use is made of a bell jar 20 (FIG. 3), having a flat base 21 and a vacuum pump connection 22. A charge crucible 23 consists of two electric terminal plates 24 and 25 secured at displaced points to the base and a rod 26 having a flat top grooved along its length to form a receptacle for the charge 27. The crucible is about 6 inches in length, with the charge concentrated in its center to distribute the charge vapor properly in the jar space, the crucible being heated by an electric current from source 28 through circuit 29, as controlled by hand switch 30.

The blanks are mounted on a rack 31 consisting of four vertical equally spaced supports 32 positioned adjacent the inside wall of the bell jar with spaced parallel ribs 33 connecting opposite supports. These ribs are spherically curved with the curve radius centering at the midpoint of the charge support rod 26. To coat the units, they are mounted crosswise on the ribs 33, side by side, with the silver coated face downward.

A charge of about 100 milligrams of potassium dihydrogen phosphate (KDP) is then placed in the crucible 23 and preheated in air to reduce to potassium metaphosphate. Alternatively, a charge of about 100 milligrams of potassium metaphosphate can be placed directly into crucible 23. A vacuum of about $5 \times 10^{-5}$ mm. Hg is now drawn inside the jar and a heating current of around 120 amperes passed through the crucible completely evaporating the charge, the evaporated chemical depositing on the face of the units and particularly between the electrodes 12 and 13 to form a dry, solid film of approximately 3 microinches in thickness. It is particularly pointed out that no added bond is used to attach the film, the film being self-bonding.

The hygrometer unit is now available for insertion in the electric circuit. In this connection it is important to evaluate the electric characteristics of the film since the usefulness of the apparatus depends largely on its capability of ready application to metering circuits. The range of resistances of the hygrometer element is found to vary over the exceptionally wide limits of $10^4$ to $10^{13}$ ohms. In addition, the resistance of the element responds to changes in relative humidity exponentially (see FIG. 6); consequently, it becomes of importance that the circuit not only indicates the logarithm of the resistance but also readily encompasses the wide resistance variations. Ordinary bridge circuits were found inadequate for this purpose since it would be necessary to use multi-range switches to cover the 6 to 9 decade resistance range. In addition, due to the high resistances involved, the use of alternating currents was found impracticable for the entire range of resistance changes since the unit possessed a capacitance of the order of 10 micromicrofarads and, therefore, a reactance of the order of $10^8$ ohms using 60 cycle current. A direct current circuit, therefore was indicated.

The ohmmeter circuit, as employed, is illustrated in FIG. 5. A 3-element electrometer tube 40 designed for high impedance and low currents is used, the filament 41 being energized by a 1.5 volt battery 42 through connecting lines 43 including variable resistor 44. The hygrometer element 14 is connected directly to grid 45; and there are provided additional fixed resistances 46 and 47 having ohmic values in the $10^6$–$10^{12}$ ohm range for calibration checking. Resistors 46, 47 and 14 are each connectible to battery 42 by way of switch arm 48, conductor 49, and slide contact 50 moving on resistance 51 to secure a series variable resistance; and, if the check of the calibration indicates correction, this may be accomplished by adjustment of the variable resistances 44 and 51. Resistor 51 has the terminal 52 thereof connected to the negative side of battery 42 by conductor 53.

The tube plate circuit includes plate 55, conductor 56, a load resistor 57 of about 80,000 ohms, a battery 58 of 7.5 volts and a recording potentiometer circuit 59, all connected in series. The potentiometer circuit includes a 40 ohm variable resistor 60 connected between the main recorder circuit terminals 61 and 62, a 1.5 volt battery 63 and a variable resistor 64 of around 50,000 ohms connected in series parallel about resistor 60, and a recording potentiometer 65 connected in parallel around resistor 60. The negative electrodes of the batteries 42 and 58 are grounded at 61. The combination of variable resistor 60 and recording potentiometer 65 is generally referred to as a meter.

There are two important attributes of the ohmmeter as above described: the measurement extends over a range of about $10^4$ to $10^{13}$ ohms as a function of changing relative humidities, and the output of the instrument is linear with relative humidity thus permitting direct readings. These attributes arise from the fact that for small grid currents the grid voltage is proportional to the logarithm of these currents; and since the plate current of a triode varies approximately linearly with grid voltage, the plate current will vary approximately linearly with the logarithm of the grid current. Thus, since the resistance of the hygrometer element varies exponentially with the relative humidity of the contacting atmosphere, relative humidity changes are recorded in direct variation by the ohmmeter.

FIGS. 6 and 9 illustrate these relationships, FIG. 9 in curve 66 showing variation of grid voltage (in respect to the ground side of the filament) with the logarithm of grid current, and FIG. 6 as previously described, indicating in curve 66a exponential variation of the hygroscopic resistance with plate current, which in turn is directly proportional to grid voltage. It follows, also, because of the logarithmic humidity-resistance relationship the measurement of the large resistance range of the hygrometer becomes possible on a single range. Thus, the entire scale of relative humidities from 0 to 100 can be directly and continously obtained in a single range of as much as 9 decades without changes in settings as would be necessary in order to obtain acceptable accuracy over smaller segments of this same scale of relative humidities by employing a Wheatstone bridge, for example. As a result of employing the circuitry described this information is made available in one range for display on an indicating or recording device.

To use the apparatus, the hygrometric element 10 is applied to the circuit of FIG. 5, with the hygroscopic film 14 connected by means of beryllium copper clips 68 and 69 (FIG. 1) attached to the electrodes 12 and 13. During a radiosonde balloon ascent, for example, the rate of change of relative humidity may be large; but the hygroscopic film, because of its extreme thinness, has sufficiently small volume to reduce moisture absorption to an ineffective amount, the resistance variable being mainly concentrated in the surface adsorption of the film. Since the adsorption lag is small, the ohmmeter reacts very rapidly to the change in ambient moisture so that a satisfactory record is obtainable of the ascent moisture characteristics.

In FIGS. 7 and 8 are illustrated curves showing a comparison between lithium chloride and potassium metaphosphate as hygrometric elements at room temperature and at —20° C. The coordinates of these curves indicate time and percent of change in the relative humidity indication. For example, at room temperature (FIG. 7), when subjected to sudden increase in relative humidity from about 33 to 80%, the thin film element undergoes a 63% change in indication on the average in 0.10 second and a 90% change in indication in 0.74 second, and in the reverse direction, the average times are 0.42 and 11.2 seconds. Under the same conditions, the average response times of the lithium chloride element are 3.0 and 35.2 seconds for increasing relative humidity and 5.9 and 25.5 seconds for decreasing relative humidity. Thus, the speed of the thin film for the 63 and 90% changes over lithium chloride are roughly 30 and 48 times for increasing relative humidity and 14 and 2.3 times for decreasing relative humidity, respectively. These average comparisons are set out below in tabular form for both room temperature and —20° C.

Average Speed of Response

ROOM TEMP.

|            | Increasing humidity, percent change in indication | | Decreasing humidity, percent change in indication | |
|---|---|---|---|---|
|            | 63 | 90 | 63 | 90 |
| KPO₃       | 0.10 | 0.74 | 0.42 | 11.2 |
| LiCl       | 3.0 | 35.2 | 5.9 | 24.5 |
| Speed increase | 30 | 48 | 14 | 2 |

−20° C.

| KPO₃       | 1.9 | 5.0 | 3.4 | 16.4 |
|---|---|---|---|---|
| LiCl       | 59.0 | 201.0 | 98.0 | 216.0 |
| Speed increase | 31 | 40 | 33 | 13 |

The above results indicate a pronounced decrease in time lag for the KPO₃ film.

Tests of the thin film were made also for hysteresis and polarization effects, hysteresis being defined as the difference in resistance of the element, converted to equivalent percent relative humidity, for increasing and decreasing humidity, and polarization as the electrolytic effect in the substance, of a direct current. The average hysteresis for the hygrometer element over the temperature range 0° to 40° C. was found to be 2.7% of the relative humidity; and the polarization effect was found to be of negligible magnitudes as applied to radiosonde uses. These effects can be further reduced by a factor of 2 by means of "humidity-cycling" that is, a subjecting of the element to alternate high (about 80%) and low (about 33%) relative humidities at room temperature for one hour without current loading, the exposure at each humidity setting lasting one minute.

For some uses, where relative humidity values range over higher values (50% to 100% relative humidity) use of an alternating current circuit is permissible. Such a circuit is illustrated in FIG. 11, where the hygrometric element is indicated at 70, the circuit including the variable transformer 71 with the variable inductance 72 supplied from a 110 volt alternating current source 73 through voltage stabilizer 74, a group of parallel known resistors 75, 76, 77, 78 arranged for optional connection in the circuit by switch arm 79, and the voltmeter 80 connected in parallel with the resistors. The resistors, in the order mentioned, may have values of 1,000,000, 100,000, 10,000 and 1,000 ohms. In use, the voltage drop across the known resistors (75, 76, 77 or 78) completely determines the value of the unknown resistance of the hygrometric element 70.

A modification of the hygrometric unit is shown in FIG. 10 wherein use is made of intermeshing comb electrodes 81 and 81a applied to the base strip 82, the hygroscopic substance 83 coating the interelectrode areas to form the unit 84. Connectors 85 and 86 may be applied as indicated. By this comb construction greater current flow is made available.

While a film thickness of 3 microinches is mentioned as a desirable deposition value of the potassium metaphosphate film, it should be understood that this value is subject to variation, depending, in part, on the resistance range and speed of response desired. The controlling factor as to film thickness is the ratio of adsorbed moisture to absorbed moisture, there being a limiting reduction in this ratio beyond which the speed of response of this element suffers. Satisfactory results have been secured within the film thickness range of 1 to 75 microinches.

Obviously many modifications and variations of the present invention are possible in the light of the above teachings. It is therefore to be understood that within the scope of the appended claims the invention may be practiced otherwise than as specifically described.

What is claimed is:

1. An electric hygrometer comprising a hygrometric resistance element the resistance of said hygrometric resistance element varying in a substantially exponential manner with linear variation in relative humidity, means for supporting said element, first circuit means coupled to said element for transposing the exponential variations in element resistance into equivalent linear values of current encompassing thereby one range of currents linearly related to relative humidity and meter circuit means coupled to said first circuit means for transposing said linear values of current into linear meter indications.

2. The electric hygrometer as defined in claim 1, said resistance of the hygrometric resistance element varying at least over the range of $10^4$ to $10^{13}$ ohms.

3. The electric hygrometer as defined in claim 4, the meter circuit means including a meter.

4. An electric hygrometer comprising in combination a hygrometric resistance element, the resistance of said hygrometric resistance element varying in substantially exponential manner with linear variation in relative humidity and electrical means coupled to said element for transposing the exponential variations in element resistance into equivalent linear values of current encompassing one range and being linearly related to relative humidity, said electrical means comprising an electron tube including a plate, a control grid and a cathode; an input circuit coupled to said grid; said input circuit being connected to said hygrometric element; a cathode circuit coupled to said input circuit; said cathode circuit including a power supply to provide a source of positive potential for said grid, and an output circuit coupled to said plate and cathode comprising a current indicating device and a source of positive potential for said plate.

5. The electric hygrometer as defined in claim 7 wherein the source of positive potential for said grid and the resistance of the hygrometric element have values such that the grid current will not exceed $10^{-4}$ ampere in value.

6. The electric hygrometer as defined in claim 5, the input circuit including a calibration resistance arranged for substitution for the hygrometric resistance and a first variable resistance arranged in series in said input circuit whereby the circuit may be calibrated.

7. The electric hygrometer as defined in claim 6, the output circuit including a fixed load resistor in series with the current indicating device and the source of positive potential for the plate, and a second variable resistance in parallel with the said indicating device whereby the extent of the span of the current output may be adjusted.

8. The electric hygrometer as defined in claim 7, the output circuit including a fixed source of potential and a third variable resistance connected in parallel with the indicating device.

References Cited in the file of this patent

UNITED STATES PATENTS

| 2,015,125 | Polin | Sept. 24, 1935 |
|---|---|---|
| 2,381,299 | McCulloch | Aug. 7, 1945 |
| 2,466,903 | Low et al. | Apr. 12, 1949 |
| 2,707,880 | Wannamaker | May 10, 1955 |
| 2,710,324 | Harmantas | June 7, 1955 |
| 2,904,765 | Seehof et al. | Sept. 15, 1959 |

UNITED STATES PATENT OFFICE
CERTIFICATE OF CORRECTION

Patent No. 3,022,667 February 27, 1962

Arnold Wexler et al.

It is hereby certified that error appears in the above numbered patent requiring correction and that the said Letters Patent should read as corrected below.

Column 6, line 21, for the claim reference numeral "4" read -- 2 --; line 40, for the claim reference numeral "7" rea -- 4 --.

Signed and sealed this 10th day of July 1962.

(SEAL)
Attest:

ERNEST W. SWIDER
Attesting Officer

DAVID L. LADD
Commissioner of Patents